US012597295B2

(12) United States Patent (10) Patent No.: US 12,597,295 B2
Mondello et al. (45) Date of Patent: Apr. 7, 2026

(54) PROVIDING AUTONOMOUS VEHICLE MAINTENANCE

(71) Applicant: Lodestar Licensing Group LLC, Evanston, IL (US)

(72) Inventors: Antonino Mondello, Messina (IT); Alberto Troia, Munich (DE)

( * ) Notice: Subject to any disclaimer, the term of this patent is extended or adjusted under 35 U.S.C. 154(b) by 0 days.

(21) Appl. No.: 18/591,386

(22) Filed: Feb. 29, 2024

(65) Prior Publication Data

US 2024/0249561 A1     Jul. 25, 2024

Related U.S. Application Data

(63) Continuation of application No. 16/940,118, filed on Jul. 27, 2020, now Pat. No. 11,948,405, which is a continuation of application No. 15/851,325, filed on Dec. 21, 2017, now Pat. No. 10,726,638.

(51) Int. Cl.
| | |
|---|---|
| *G07C 5/00* | (2006.01) |
| *G01C 21/34* | (2006.01) |
| *G05D 1/00* | (2024.01) |
| *G05D 1/227* | (2024.01) |
| *G06Q 10/20* | (2023.01) |
| *G07C 5/08* | (2006.01) |

(52) U.S. Cl.
CPC ............. *G07C 5/006* (2013.01); *G01C 21/34* (2013.01); *G06Q 10/20* (2013.01); *G07C 5/008* (2013.01); *G07C 5/0808* (2013.01); *G05D 1/0088* (2013.01); *G05D 1/227* (2024.01)

(58) Field of Classification Search
CPC ...... G07C 5/006; G07C 5/008; G07C 5/0808; G01C 21/34; G06Q 10/20; G05D 1/227; G05D 1/0088
See application file for complete search history.

(56) References Cited

U.S. PATENT DOCUMENTS

| | | | |
|---|---|---|---|
| 10,726,638 B2 | 7/2020 | Mondello et al. | |
| 11,948,405 B2 | 4/2024 | Mondello et al. | |
| 2015/0348335 A1 | 12/2015 | Ramanujam | |
| 2017/0038777 A1 | 2/2017 | Harvey | |
| 2017/0139412 A1* | 5/2017 | Keohane | G01C 21/34 |
| 2017/0299633 A1 | 10/2017 | Pietrowicz et al. | |
| 2018/0272992 A1 | 9/2018 | Gage et al. | |
| 2018/0322775 A1 | 11/2018 | Chase et al. | |
| 2019/0154453 A1* | 5/2019 | Leone | B60W 30/188 |
| 2019/0188493 A1 | 6/2019 | Tiziani | |
| 2019/0197795 A1 | 6/2019 | Mondello et al. | |
| 2020/0317216 A1* | 10/2020 | Konrardy | B60W 30/182 |
| 2020/0357194 A1 | 11/2020 | Mondello et al. | |
| 2023/0084713 A1 | 3/2023 | Tong et al. | |

* cited by examiner

*Primary Examiner* — Michael D Lang

(57) ABSTRACT

Systems and methods for providing autonomous vehicle assistance are disclosed. In one embodiment, a method is disclosed comprising detecting a service condition in response to a fault occurring at an autonomous vehicle at a first location; coordinating service with a nearby service provider, the service provider providing a time window and a second location; predicting that the autonomous vehicle will be free to fulfill the service; driving the autonomous vehicle to the second location of the service provider during the time window; and returning the autonomous vehicle to the first location after the service is completed.

20 Claims, 10 Drawing Sheets

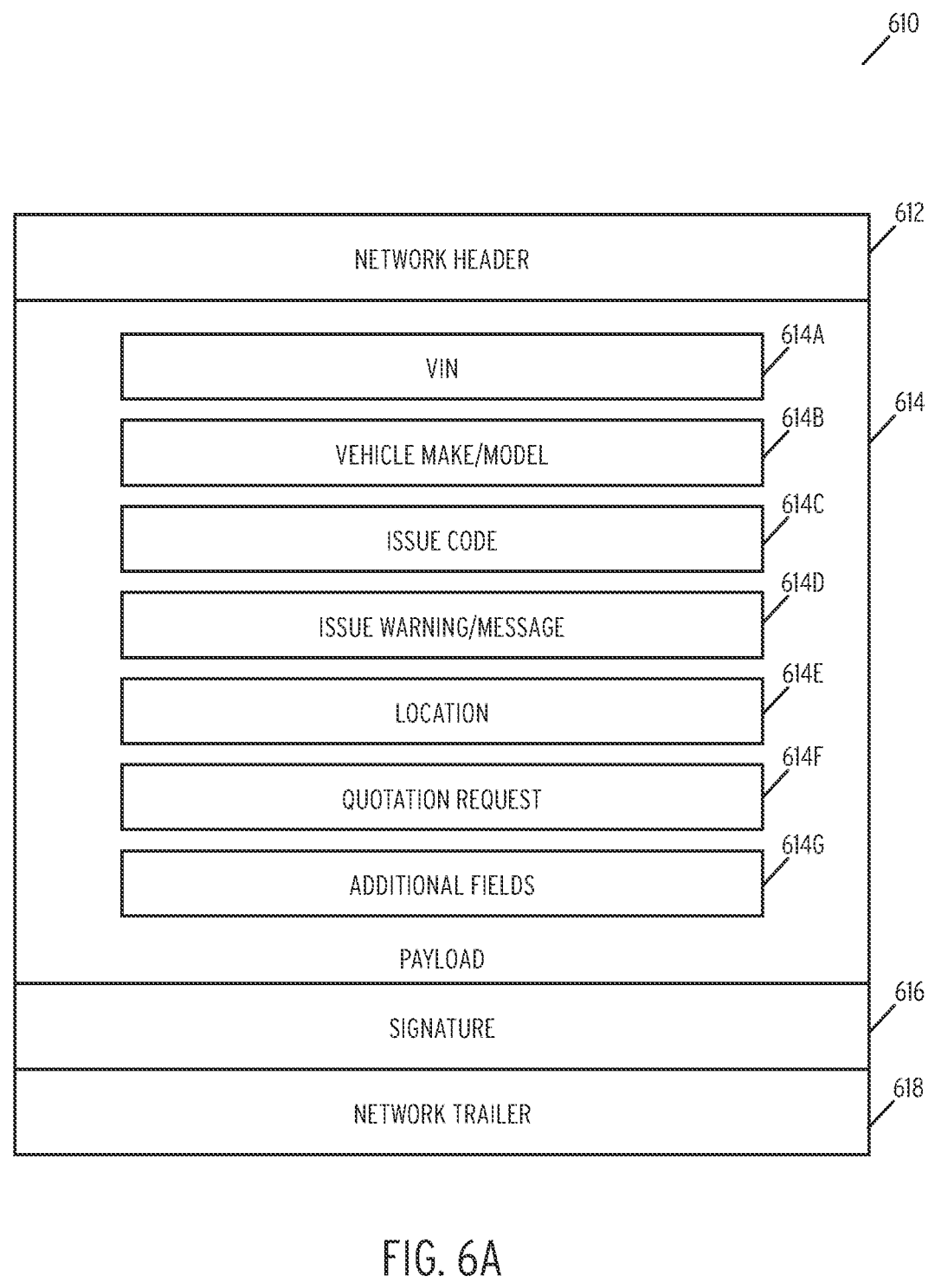

610

NETWORK HEADER                                                           612

VIN                                                           614A

VEHICLE MAKE/MODEL                                           614B

ISSUE CODE                                                   614C          614

ISSUE WARNING/MESSAGE                                        614D

LOCATION                                                     614E

QUOTATION REQUEST                                            614F

ADDITIONAL FIELDS                                            614G

PAYLOAD

SIGNATURE                                                    616

NETWORK TRAILER                                              618

FIG. 6A

PROVIDING AUTONOMOUS VEHICLE MAINTENANCE

CROSS REFERENCE TO RELATED MATTERS

The present application is a continuation application of U.S. patent application Ser. No. 16/940,118 filed Jul. 27, 2020, which is a continuation application of U.S. patent application Ser. No. 15/851,325 filed Dec. 21, 2017, issued as U.S. Pat. No. 10,726,638 on Jul. 28, 2020, entitled "Providing Autonomous Vehicle Maintenance", the entire disclosure of which application is hereby incorporated herein by reference.

COPYRIGHT NOTICE

BACKGROUND

Autonomous vehicles are continually being refined and deployed to the public. Given the nature of autonomous vehicles, large amounts of data regarding the operation of autonomous vehicles are being generated. While a large portion of this data comprises sensor readings to enable the movement of autonomous vehicles, a significant portion of data represents the status of the autonomous vehicle (including parts and components).

Currently, little attention has been placed on efficiently utilizing data regarding the servicing of an autonomous vehicle. Since autonomous vehicles have the ability to autonomously operate without intervention of an owner or operator, there exists a need to leverage this autonomous driving to perform routine tasks while the autonomous vehicle is not being utilized.

SUMMARY

The disclosed embodiments relate to providing assistance to autonomous vehicles using measured statuses of parts or components of the autonomous vehicle. The disclosed embodiments describe systems and methods for monitoring the status of an autonomous vehicle and automatically negotiating service for parts or components that need to be serviced or replaced (as well as for routine maintenance).

To enable this functionality, the disclosed embodiments also describe techniques for monitoring and predicting component faults. The disclosed embodiments additionally describe techniques for predicting appropriate times to automatically service an autonomous vehicle. The disclosed embodiments additionally disclose a secure message passing algorithm to ensure the integrity of the negotiation of automated service.

In one embodiment, a method is disclosed comprising detecting a service condition in response to a fault occurring at an autonomous vehicle at a first location; coordinating service with a nearby service provider, the service provider providing a time window and a second location; predicting that the autonomous vehicle will be free to fulfill the service; driving the autonomous vehicle to the second location of the service provider during the time window; and returning the autonomous vehicle to the first location after the service is completed.

In another embodiment, a method is disclosed comprising: generating a freshness indicator, the freshness indicator comprising an incrementing message counter, the incrementing message counter comprising one of a monotonic counter, a timestamp, a nonce, or similar counter; generating a session key based on a vehicle-specific key, the vehicle-specific key comprising a secret key stored locally at a vehicle and not transmitted over a public bus, and the freshness indicator; generating a payload, the payload including the freshness indicator; generating a signature by executing a message authentication code (MAC) algorithm using the session key and the payload generating a packet comprising the payload and the signature, the signature generated; and transmitting the packet to the service provider.

In yet another embodiment, a system is disclosed comprising a processor and a storage medium for tangibly storing thereon program logic for execution by the processor, the stored program logic comprising logic, executed by the processor, for detecting a service condition in response to a fault occurring at an autonomous vehicle at a first location; logic, executed by the processor, for coordinating service with a nearby service provider, the service provider providing a time window and a second location; logic, executed by the processor, for predicting that the autonomous vehicle will be free to fulfill the service; logic, executed by the processor, for driving the autonomous vehicle to the second location of the service provider during the time window; and logic, executed by the processor, for returning the autonomous vehicle to the first location after the service is completed.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, they instead emphasize the illustrating principles of the disclosure.

FIGS. 6A and 6B are diagrams illustrating packets utilized for communication autonomous vehicle service requests and responses according to some embodiments of the disclosure.

DETAILED DESCRIPTION

Figure 1:
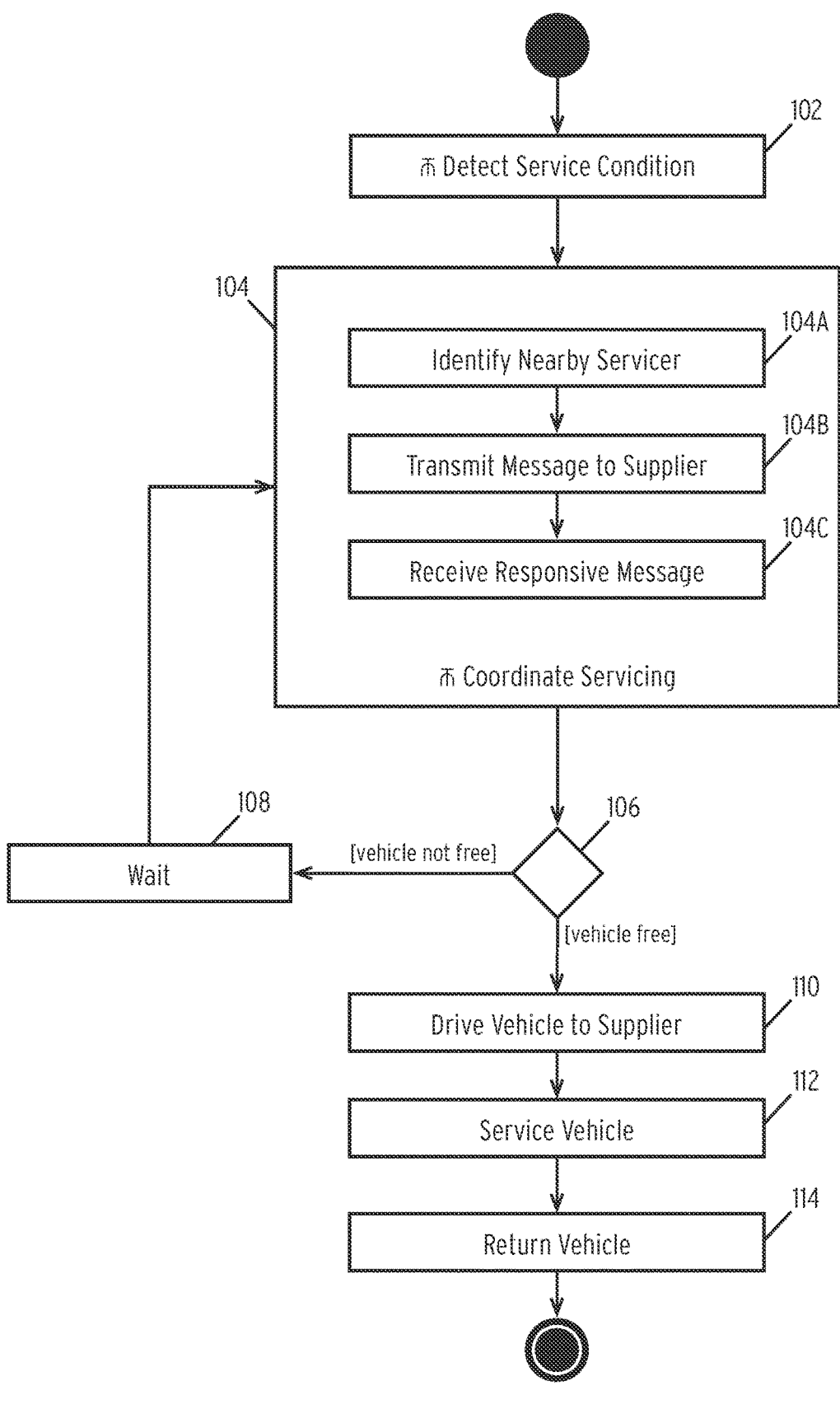
FIG. 1 is a flow diagram illustrating a method for automating autonomous vehicle maintenance according to some embodiments of the disclosure.

The present disclosure will now be described more fully hereinafter with reference to the accompanying drawings, which form a part hereof, and which show, by way of illustration, certain example embodiments. Subject matter may however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

FIG. 1 is a flow diagram illustrating a method for automating autonomous vehicle maintenance according to some embodiments of the disclosure.

In step 102, the method detects a service condition.

In general, a service condition refers to a configuration or state of an autonomous vehicle that requires servicing. Examples of servicing include replacing faulty components, providing emergency assistance, or performing routine maintenance. The disclosure does not limit the type of service.

The method detects a service condition using various mechanisms. In one embodiment, the method employs reactive monitoring routines. In this embodiment, the method monitors an autonomous vehicle to determine if service is necessary. For example, the method may monitor a controller area network (CAN) bus to identify message indicating component faults to detect a service condition. As another example, the method may monitor impact sensors of a vehicle to determine the autonomous vehicle requires emergency service.

Alternatively, or in conjunction with the foregoing, the method proactively monitors autonomous vehicle components for servicing. In general, this embodiment comprises predicting or forecasting potential service conditions. As one example, the method may periodically trigger a service condition to perform routine maintenance. As another example, the method may monitor the state of an autonomous vehicle and identify that a given component will experience a fault soon (e.g., a low power output of a headlight) and will need servicing. As another example, the method utilizes a predictive model of components installed in the autonomous vehicle. Using this model and parameters of the component, the method can predict when a component may fail in the future.

In some embodiments, the method detects a service condition by monitoring the system for triggers. The description of FIGS. 2A through 2D (incorporated herein by reference) describes these triggers and embodiments in more detail. In one embodiment, the method may immediately proceed to step 104 upon detecting a trigger. In some embodiments, the method may instead store the service conditions and delay moving to step 104 until a later time (e.g., when a vehicle is free).

In step 104, the method coordinates servicing of the autonomous vehicle.

After detecting a state of an autonomous vehicle that requires servicing, the method automatically coordinates servicing of the vehicle. The coordination of service does not require human intervention and the method coordinates the service such that the autonomous vehicle can service itself. Since there is no human intervention, step 104 includes various sub-steps, discussed herein.

In sub-step 104A, the method identifies a nearby servicer.

As used herein, servicer refers to an entity that provides a service to the autonomous vehicle. A servicer includes an automotive repair shop, an autonomous vehicle dealer, emergency vehicles/personnel, or any other entity that may provide service to an autonomous vehicle.

In sub-step 104A, an autonomous vehicle has a location represented by geographic coordinates. The autonomous vehicle may obtain these coordinates via a global positioning system (GPS) receiver installed within the vehicle or similar positioning system such as 4G, 5G, or A-GPS position system. In some embodiments, the autonomous vehicle may refine the location by using one or more sensors. For example, the autonomous vehicle may use radar or Lidar sensors to pinpoint which side of a roadway the autonomous vehicle is on.

The autonomous vehicle transmits this location data to a central server as a query. In response, the central server returns details of a nearby servicer (e.g., the closest available servicer). In some embodiments, the details include the servicer name, a contact address, an internet protocol (IP) address, and various other details discussed herein.

In sub-step 104B, the method transmits a message to the nearby supplier.

In sub-step 104C, the method receives a responsive message from the service provider.

In one embodiment, the method transmits a message indicating the service condition to a service provider. The description of FIG. 6A (incorporated herein by reference) describes the specifics of the messages sent from an autonomous vehicle to a service provider. Similarly, the autonomous vehicle receives a responsive message from the service provider to trigger movement of the vehicle. The description of FIG. 6B (incorporated herein by reference) describes the specifics of the messages sent to an autonomous vehicle from a service provider. The description of FIG. 7 (incorporated herein by reference) describes the specifics of the messages between an autonomous vehicle and a service provider.

In step 106, the method determines if the autonomous vehicle is free.

After coordinating a service location and service options in step 104, the method determines whether the autonomous vehicle can be serviced after coordinating the service. In some embodiments, an autonomous vehicle is not free when it is in use by an occupant and/or owner. In some embodiments, a vehicle is free when the occupant/owner is at work, at home, on holiday, or otherwise not using the vehicle.

In some embodiments, the method uses a predictive model to determine whether a vehicle will be free in the future. For example, the method can determine that a vehicle is currently not in use and can use a predictive model to determine a person will use the vehicle in a predefined window of time needed for servicing. The description of FIGS. 3A and 3B (incorporated herein by reference) describe examples of this predictive modeling.

In step 108, the method waits until the autonomous vehicle is free.

In some embodiments, the method may wait for a predefined time interval generated using the predictive model before re-executing step 104. In other embodiments, the method may wait for an independent pre-defined time interval before re-executing step 104. After the interval expires, the method re-executes step 104 to obtain updated service data.

In step 110, the method drives the autonomous vehicle to the service location.

In one embodiment, the method receives a message in step 104C that includes a coordinate of a service location. The message may also include an arrival window. Using these data points, the method identifies a route using a mapping service provided by the autonomous vehicle. The method then uses one or more APIs of the autonomous vehicle to start the vehicle and provide the routing information to the operating system of autonomous vehicle.

In step 112, the method services the vehicle.

In some embodiments, the service comprises manual service by a technician or other professional. In other embodiments, an automated service device may perform the service. For example, in some embodiments, an automated device refuels a vehicle as part of the service, or replaces components of the autonomous vehicle as part of the service.

In step 114, the method returns the vehicle.

As discussed above, the autonomous vehicle stores a location where the autonomous vehicle is situated prior to servicing. In the illustrated embodiment, the autonomous vehicle uses this location to build a route using a mapping service provided by the autonomous vehicle. The method then uses one or more APIs of the autonomous vehicle to start the vehicle and provide the routing information to the operating system of autonomous vehicle.

The method illustrated and discussed above describes methods for automatically servicing an autonomous vehicle.

To further describe the operations in FIG. 1, the following figures provide further technical detail on the implementation of certain steps.

Figures 2A, 2B, 2C, 2D:
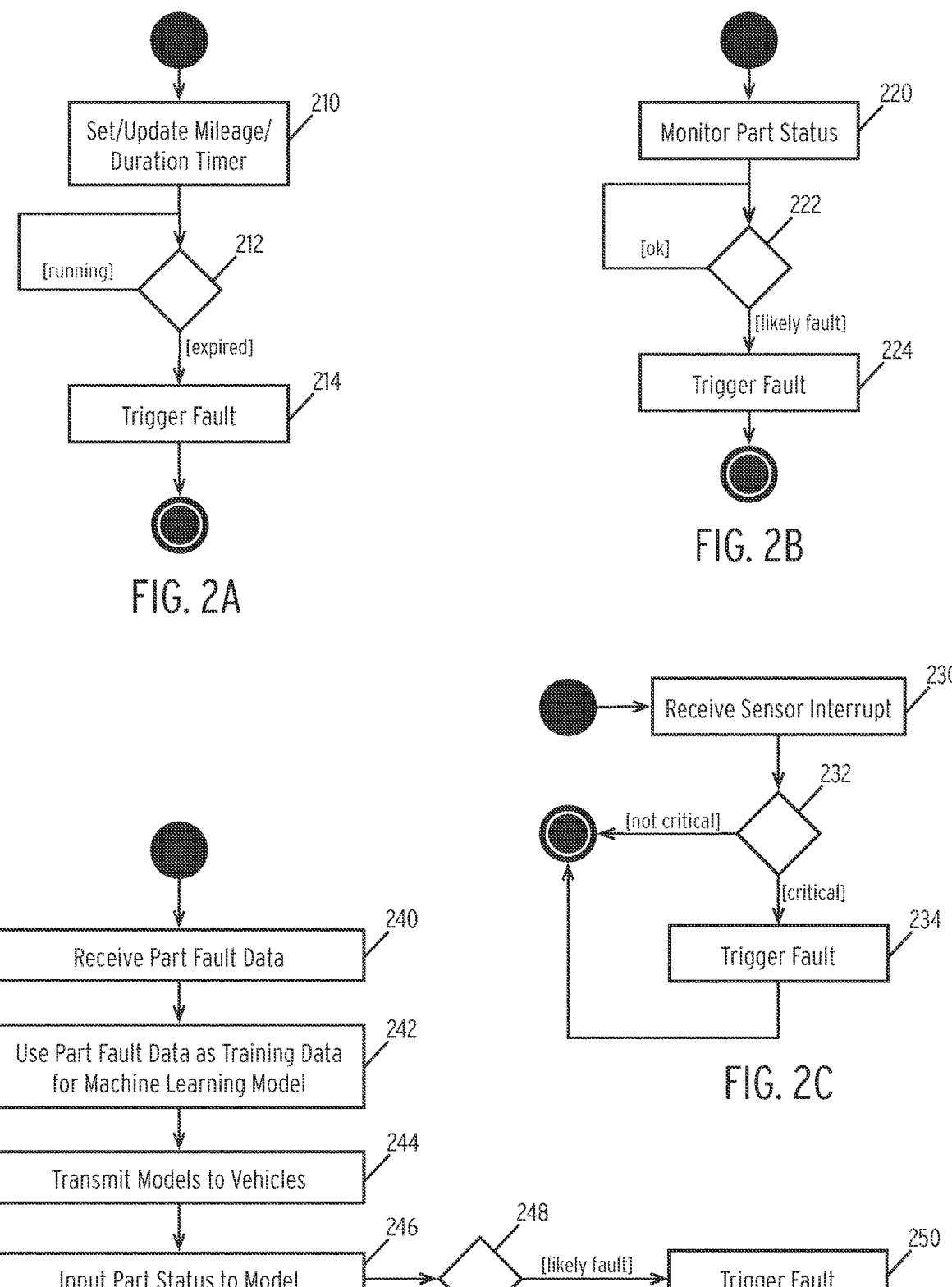
FIG. 2A is a flow diagram illustrating a method for triggering a fault based on a timer according to some embodiments of the disclosure.
FIG. 2B is a flow diagram illustrating a method for triggering a fault based on a part status according to some embodiments of the disclosure.
FIG. 2C is a flow diagram illustrating a method for triggering a fault based on a sensor status according to some embodiments of the disclosure.
FIG. 2D is a flow diagram illustrating a method for triggering a fault based on a a predicted part failure according to some embodiments of the disclosure.

FIG. 2A is a flow diagram illustrating a method for triggering a fault based on a timer according to some embodiments of the disclosure.

In step 210, the method sets a mileage or duration timer.

In some embodiments, the method may use both a mileage and a duration timer may while in other embodiments the method uses only a single timer. In the illustrated embodiment, a mileage timer refers to timer monitoring the mileage of an autonomous vehicle. That is, the mileage timer sets a defined interval and resets the interval when reaching the interval. In the illustrated embodiment, a duration timer refers to a predefined duration of time to monitor. In some embodiments, an autonomous vehicle may have a single mileage or duration timer. In other embodiments, each part or component of the autonomous vehicle may have a corresponding mileage and/or duration timer. As used herein, a "part" refers to any component or subsystem of an autonomous vehicle or, in some instances, the autonomous vehicle itself.

In step 212, the method determines whether the timer(s) have expired. If not, the method continues to monitor the timers. Monitoring a timer comprises determining if the timer reaches the mileage amount (for a mileage timer) or whether the timer reaches the defined time interval (for a duration timer).

In step 214, the method triggers a fault when the timer expires.

As described above, triggering a fault may comprise generating an interrupt to a service application installed within an autonomous vehicle. In some embodiments, the fault includes details of the underlying fault (e.g., a component identifier, a description of the fault, a fault code, etc.). As described above, an autonomous vehicle may execute the method illustrated in FIG. 2A for the entire autonomous vehicle or on a part-by-part basis.

FIG. 2B is a flow diagram illustrating a method for triggering a fault based on a part status according to some embodiments of the disclosure.

In step 220, the method monitors the status of a part.

In one embodiment, an autonomous vehicle may provide access to data regarding each part of the vehicle. For example, the autonomous vehicle provide access to a fuel level of the vehicle or the current brightness of a headlight. In this embodiment, the method monitors the levels of each component by retrieving the levels for each component.

In step 222, the method determines whether the levels of the parts are operating normally.

In one embodiment, the method stores a list of minimum and/or maximum operating levels for each component. For example, a fuel level minimum may be 15%. In step 222, the method compares the received levels to minimums and/or maximums to determine whether the part is at risk of failing. If the part is operating within the ideal operating range, the method continues to monitor the autonomous vehicle in step 220.

In step 224, the method determines that the part is likely to experience failure and thus triggers a fault.

Continuing the example above, the method may determine that a fuel level is within a pre-defined distance of the minimum fuel level (15%). In the illustrated embodiment, in contrast to FIG. 2A, the method preemptively triggers a fault causing the autonomous vehicle to trigger a service condition.

FIG. 2C is a flow diagram illustrating a method for triggering a fault based on a sensor status according to some embodiments of the disclosure.

In step 230, the method receives a sensor interrupt.

In one embodiment, an autonomous vehicle includes one or more sensors such as impact sensors or other sensors. An accident or other impact triggers these sensors. The sensors then transmit signals to the operating system of the autonomous vehicle. In one embodiment, the method monitors the autonomous vehicle for the presence of these signals.

In step 232, the method determines if the sensor interrupt represents a critical event.

In some embodiments, the sensors trigger interrupts for minor impacts that do not require servicing (e.g., contact by another vehicle's bumper during parking). In one embodiment, the method analyzes the sensor data to determine if the impact level exceeds a predetermined threshold. If so, the method classifies the impact as a critical event. In some embodiments, the method may additionally cross-reference the impact data with other log data. For example, the method may analyze log data of the autonomous vehicle to determine if the autonomous vehicle deployed an airbag near the time of the critical interrupt.

In step 234, the method triggers a fault after determining that the sensor interrupt was a critical one. Alternatively, the method continues to monitor for sensor interrupts if the interrupt was not critical.

FIG. 2D is a flow diagram illustrating a method for triggering a fault based on a predicted part failure according to some embodiments of the disclosure.

In step 240, the method receives part fault data.

In one embodiment, an autonomous vehicle may continuous store and/or transmit faulty part data. In one embodiment, the fault data comprises an identifier of a part or component and a fault. In one embodiment, a fault comprises data representing a problem with the part or component (e.g., low fuel, low headlight intensity, etc.). In some embodiments, the fault data includes an indicator of the severity of the fault.

In step 242, the method uses the fault data to train a machine learning (e.g., predictive) model.

In one embodiment, the method may use various predictive models such as neural networks, convolutional neural networks, deep neural networks, recursive artificial neural network (RNN), clustering models, etc. Regardless of the model used, the method trains the model using the part fault data. In one embodiment, the method trains models at a central location. In other embodiments, the method trains the models at the autonomous vehicle itself. In one embodiment, the method generates multiple models, one for each part. In other embodiments, the method may generate multiple models for a single part. In this embodiment, the method trains a model for each fault for each part or component.

In step 244, the method transmits the models to the autonomous vehicle. In some embodiments, step 244 may be optional if the method trains the models at the autonomous vehicle.

In step 246, the method inputs a part status to the model.

In one embodiment, the part status corresponds to "live" data regarding a part represented by one or more models. In some embodiments, the part status may comprise a time series of measurements of the part status.

In step 248, the method analyzes the output of the model to determine if a fault is likely.

In one embodiment, the output of the model comprises a probability that a fault has occurred or will occur in the future. In one embodiment, the method determines if the probability exceeds a predefined threshold (e.g., a confidence level).

If the method determines that the confidence level does not exceed a required score, the method ends. In some embodiments, the method may continuously re-execute steps 240-248 for each part.

In step 250, the method triggers a fault for a given part upon determining that the output of the predictive model exceeds a predetermined threshold. The preceding descriptions (incorporated herein by reference) describe the triggering of a fault.

Figure 3A:
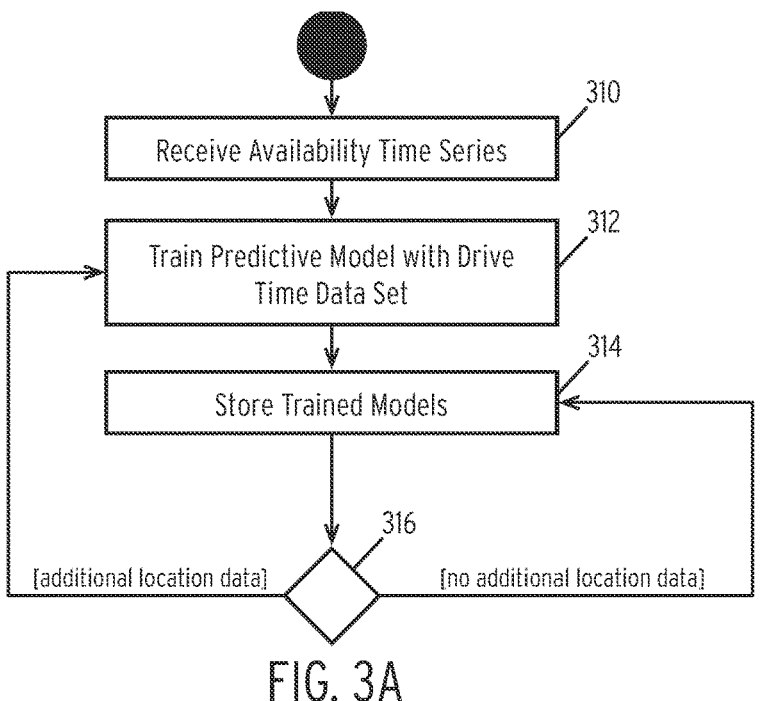
FIG. 3A is a flow diagram illustrating a method for training an availability model according to some embodiments of the disclosure.

FIG. 3A is a flow diagram illustrating a method for training an availability model according to some embodiments of the disclosure.

In step 310, the method receives an availability time series.

In one embodiment, an availability time series comprises a series of measurements of when an autonomous vehicle is availability. The availability time series may comprise a series of tuples including a time and a flag indicating availability (e.g., [$t_0$, available], [$t_1$, available], [$t_2$, unavailable], [$t_3$, unavailable] . . . ).

In step 312, the method uses the availability time series to train a predictive model.

In one embodiment, the machine learning system comprises a recurrent artificial neural network (RANN) with long short-term memory (LSTM). In step 312, the method uses the time series to train the RNN. In one embodiment, an LSTM-based model is used in order to train the machine learning system based on past measurements of availability.

In step 314, the method stores the trained models.

In one embodiment, the models are transmitted from a central location to an autonomous vehicle. In other embodiments, the models may be trained directly by an autonomous vehicle and may be stored on persistent storage.

In step 316, the method determines if additional location data was received.

In one embodiment, the location data comprises an entry in the time series data discussed previously. If the method detects a new tuple (time and status) has been identified the method may re-train the predictive model in steps 312-314. Alternatively, if the method does not identify new data, the method may continue to store the previously trained predictive model.

Figure 3B:
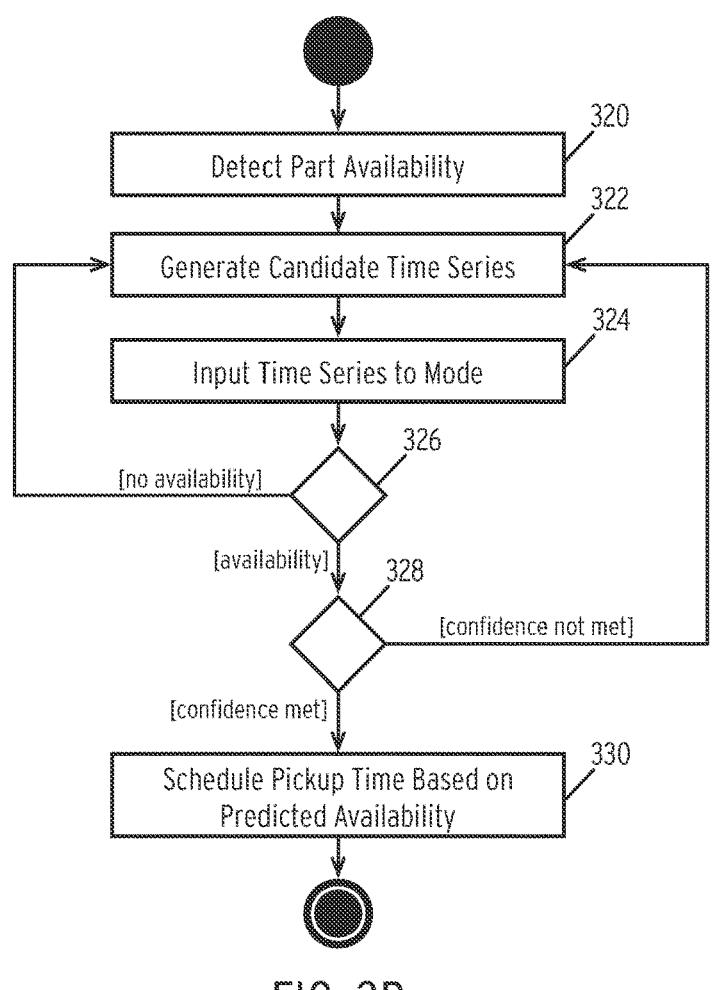
FIG. 3B is a flow diagram illustrating a method for predicting availability of an autonomous vehicle according to some embodiments of the disclosure.

FIG. 3B is a flow diagram illustrating a method for predicting availability of an autonomous vehicle according to some embodiments of the disclosure.

In step 320, the method detects a part availability.

As discussed previously, after detecting a fault, the method transmits a message to a service provider. The service provider responds indicating a part is available.

In step 322, the method generates a candidate time series.

In one embodiment, the candidate time series may comprise a single timestamp. In other embodiments, the candidate time series may include a series of timestamps representing the total time required to fulfill the service request.

In step 324, the method inputs the time series to the predictive model.

In one embodiment, the predictive model comprises the RANN or similar predictive model generated in FIG. 3A.

In step 326, the method analyzes the output of the predictive model for the candidate time series.

In one embodiment, the predictive model may output a result that indicates that the autonomous vehicle will not be available during the candidate time series. If this is the case, the method regenerates another candidate time series. In one embodiment, the second candidate time series may comprise a time series shifted into the future relative to the first candidate time series. The method may then re-execute steps 324 and 326 for the second candidate time series. Steps 324 and 326 may be repeated until the method detects an available time period in step 326.

In step 328, the method detects that the predictive model identified a suitable availability time period and analyzes the confidence of that prediction.

In one embodiment, the predictive model generates an indicator of the availability of the autonomous vehicle during a given period of time represented by the time series. The model may additionally generate a confidence of that prediction. In step 328, the method confirms that this confidence is above a predefined threshold (e.g., 50%) in order to prevent weak predictions. If the confidence level of the prediction does not meet the required confidence level, the method re-executes steps 324 through 326 as discussed above.

In step 330, the method schedules a pickup time based on the predicted availability.

In one embodiment, after confirming that the autonomous vehicle will be available during a given time period and that the prediction is a valid prediction the method transmits a message to a service provider requesting service during the given time period. The service provider may then transmit a message confirming the time period.

In some embodiments, the service provider may transmit a message indicating that the predicted time period is not suitable for the provider. In this case, the method may re-execute to generate a second time period. In some embodiments, the service provider may transmit a proposed time period. In this embodiment, the method re-executes steps 324-330 to confirm that the time period represents an available time period.

Figure 4:
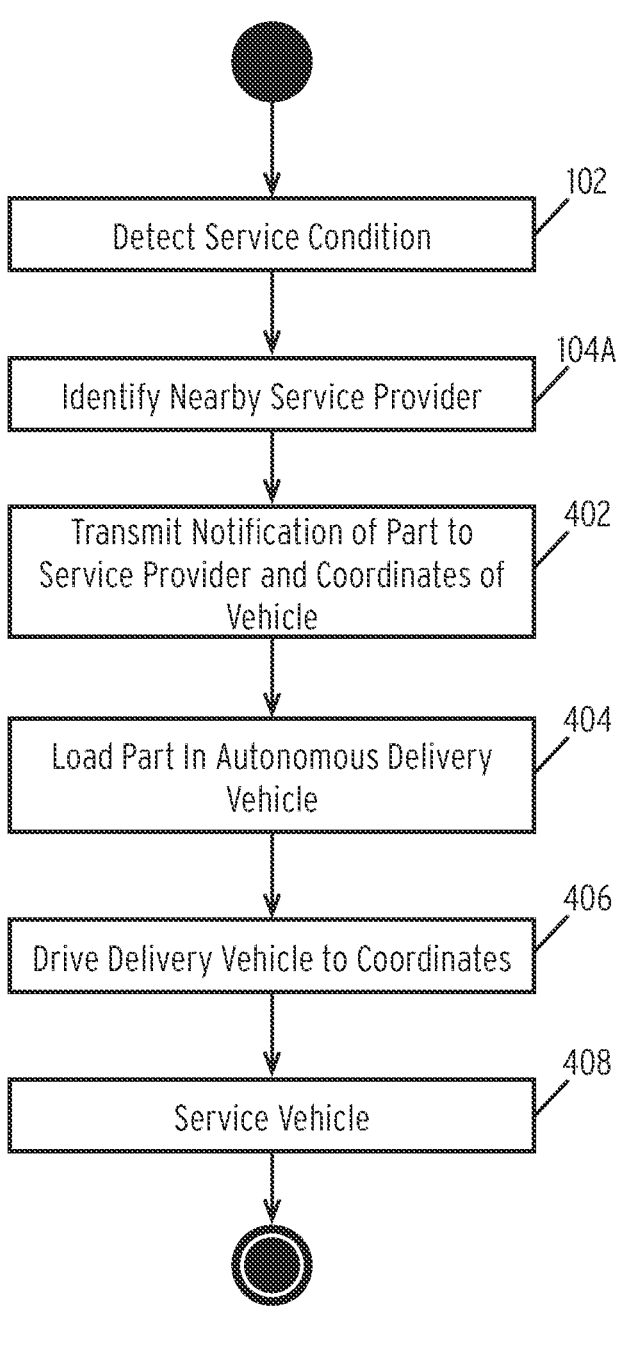
FIG. 4 is a flow diagram illustrating a method for servicing an autonomous vehicle according to some embodiments of the disclosure.

FIG. 4 is a flow diagram illustrating a method for servicing an autonomous vehicle according to some embodiments of the disclosure. FIG. 4 illustrates a particular embodiment of the method illustrated in FIG. 1, the description incorporated by reference in its entirety.

In steps 102 and 104A, the method detects a service condition and identifies a nearby supplier, respectively. FIG. 1 discusses these steps in more detail and the detail of these steps is not repeated herein.

In step 402, the method transmits a notification of the part to the service provider as well as the coordinates of the vehicle. In this step, the method may transmit a packet (discussed in FIG. 6A) to the service provider that includes the precise coordinates of the autonomous vehicle. These coordinates may be generated using GPS and/or autonomous vehicle sensors such as radar, Lidar, or sonar sensors.

In step 404, the method loads a replacement part in an autonomous delivery vehicle.

In one embodiment, the autonomous delivery vehicle comprises an autonomous vehicle operated by the service provider. In alternative embodiments, a non-autonomous vehicle may be utilized.

In step 406, the method drives the autonomous delivery vehicle to the locations identified by the coordinates and, in step 408, services the vehicle.

In some embodiments, driving and servicing of the vehicle may be completely autonomous. For example, certain service requirements (e.g., refueling, etc.) may be performed completely without human intervention. In other embodiments, the method may drive an occupant to the coordinates in order to service the autonomous vehicle. In this embodiment, the autonomous delivery vehicle may act as a shuttle for an employee of the service provider. In some embodiments, the method may further instruct the autonomous delivery vehicle to pick up a part at a designated location and drive the occupant to the autonomous vehicle's location to service the autonomous vehicle.

Figure 5:
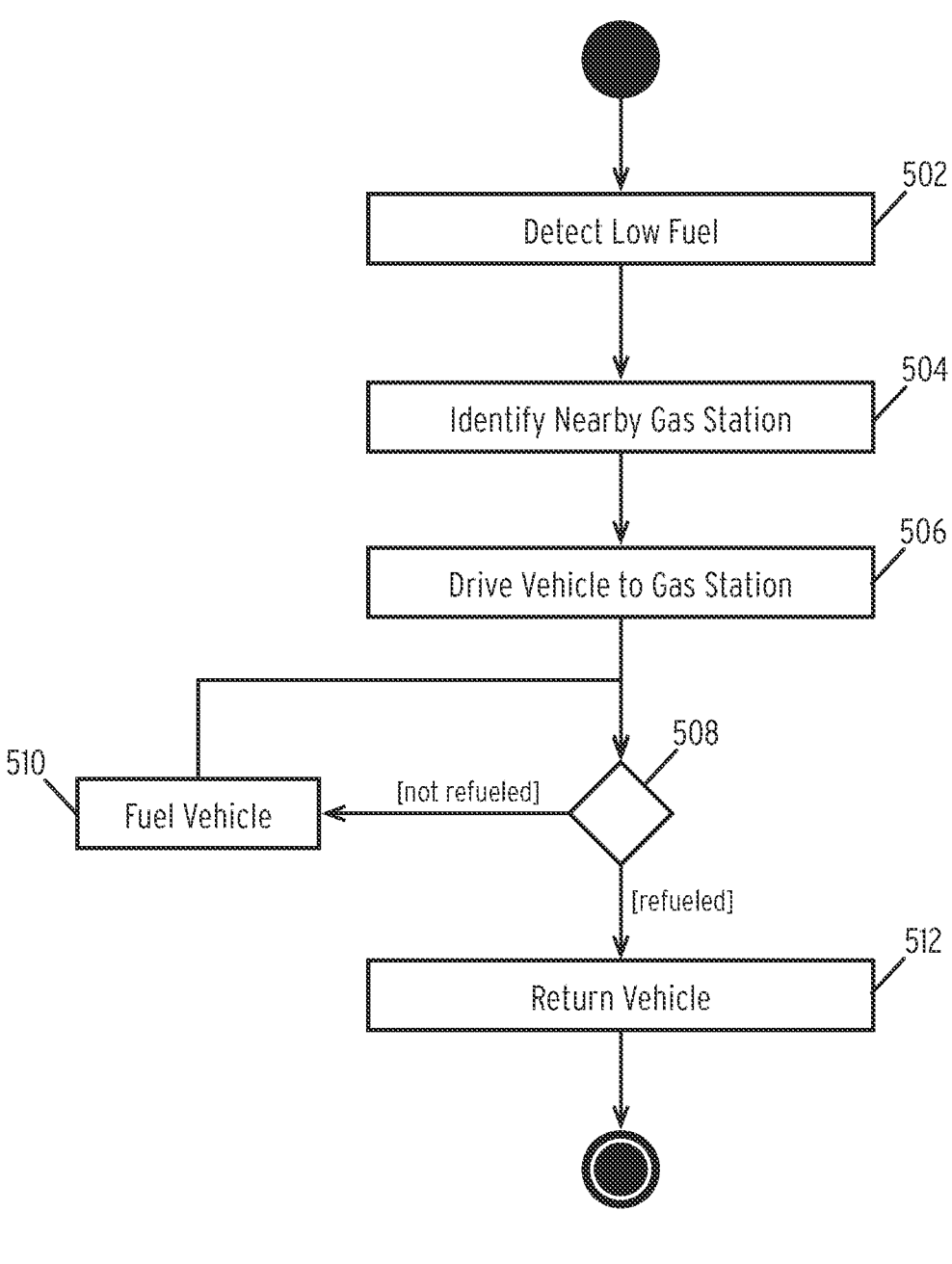
FIG. 5 is a flow diagram illustrating a method for refueling an autonomous vehicle according to some embodiments of the disclosure.

FIG. 5 is a flow diagram illustrating a method for refueling an autonomous vehicle according to some embodiments of the disclosure. FIG. 5 illustrates a particular embodiment of the method illustrated in FIG. 1, the description incorporated by reference in its entirety.

In step 502, the method detects a low fuel condition.

In one embodiment, the method may monitor a fuel sensor of the autonomous vehicle. The method may detect a low fuel condition when the fuel sensor reading is below a predetermined threshold (e.g., 15% of total fuel capacity).

In step 504, after detecting the low fuel condition the method identifies a nearby gas station. In the illustrated embodiment, the details of step 504 may be substantially similar to that of step 104 discussed in connection with FIG. 1.

In step 506, the method drives the autonomous vehicle to the nearby gas station. In the illustrated embodiment, the details of step 506 may be substantially similar to that of step 110 discussed in connection with FIG. 1.

In some embodiments, the method may additional schedule a time to drive to a nearby gas station as discussed in step 106 of FIG. 1 and FIGS. 3A and 3B.

In step 508, the method begins refueling the autonomous vehicle and determines if the autonomous vehicle is refueled (step 510).

In one embodiment, the method monitors a fuel sensor to determine when the fuel level is at or near 100%. Upon reaching 100% (or near 100%), the method determines that the vehicle is fully refueled. In one embodiment, the method may further perform a payment operation to pay for the refueling at this time. In one embodiment, the method may utilize a stored form of payment associated with the autonomous vehicle. In some embodiments, the determined fuel level may be less than 100%. In some embodiments, this fuel level may be set based on owner preferences. For example, the owner may set a maximum monthly fuel budget and the method may attempt to meet this budget. In some embodiments, the method may store an amount spent to date on fuel for the autonomous vehicle and may generate a prediction of how many times the autonomous vehicle may require fuel for a given month. After making this prediction, the method may dynamically adjust the fuel level to meet the monthly target.

In step 512, the method returns the vehicle to the original location after refueling. In the illustrated embodiment, the details of step 512 may be substantially similar to that of step 114 discussed in connection with FIG. 1.

Figure 6B:
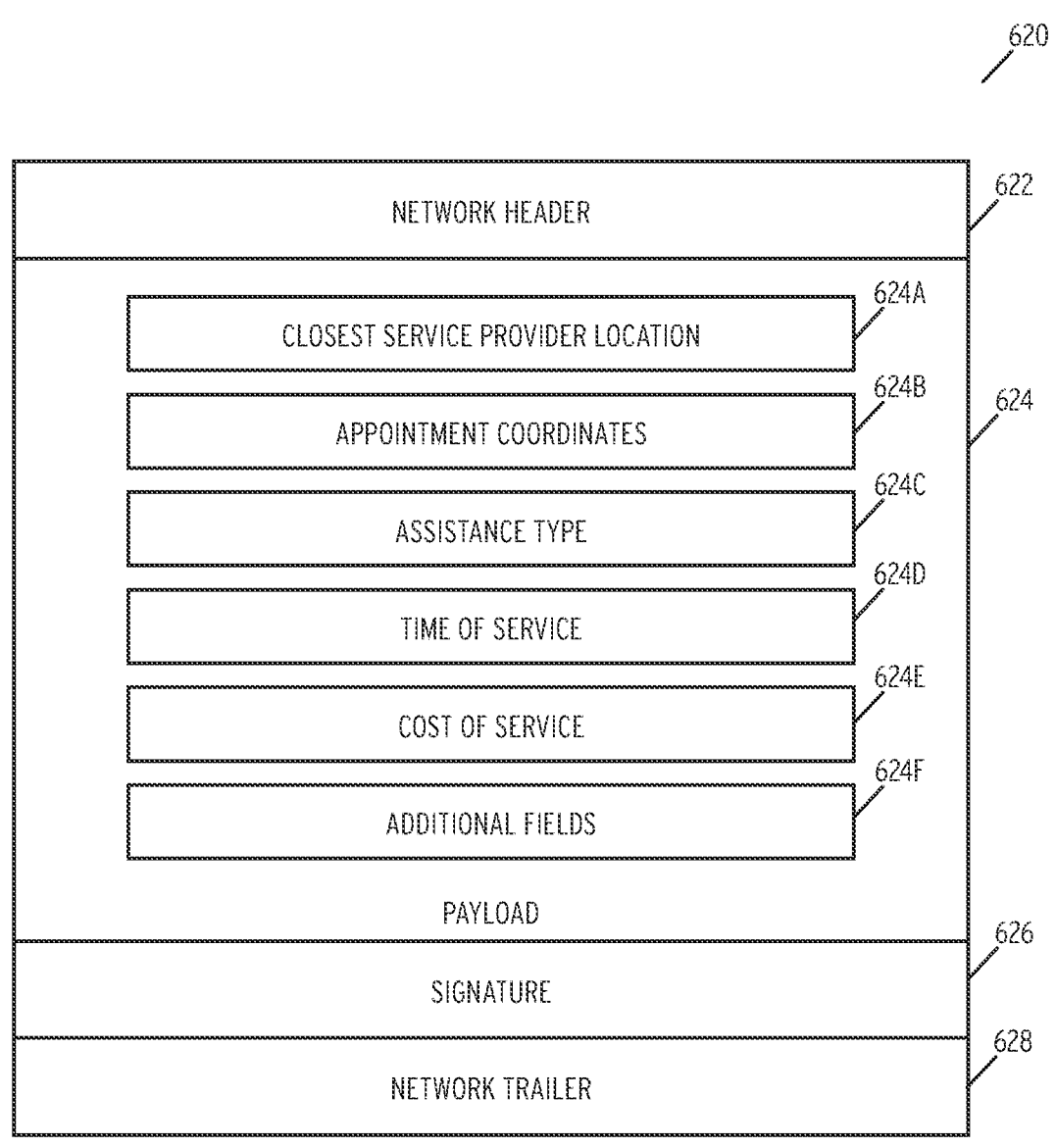

FIGS. 6A and 6B are diagrams illustrating packets utilized for communication autonomous vehicle service requests and responses according to some embodiments of the disclosure.

In the illustrated embodiments, packet 601 comprises a packet sent from an autonomous vehicle to a service provider and packet 602 comprises a packet sent from a service provider to an autonomous vehicle.

Each packet 601, 602 includes a network header 612, 622 and a network trailer 618, 628, respectively. The network header and trailer may be selected based on the underlying network used to transmit the packets 601, 602. In some embodiments, the headers and trailers may comprise TCP/IP headers and trailers.

Each packet additionally includes a respective signature 616, 626. In one embodiment, the signatures are calculated using a message authentication code (MAC) function (e.g., HMAC, SHA2, etc.). In the illustrated embodiment, a signature is calculated using the MAC function with a session key and the respective payloads 614, 624 as input parameters.

Each packet 601, 602 additionally includes respective payload 614, 624.

In packet 601, a payload 614 may include a vehicle identification number (VIN) 614A and a make and model of the autonomous vehicle 614B. The payload 614 may additionally include an issue code 614C representing a coded issue detected with respect to a part or component. The payload 614 may additionally include an issue warning or message 614D. In one embodiment, the issue warning or message 614D comprises a description of the issue requiring servicing. The payload 614 may additionally include a location 614E. In one embodiment, the location 614E comprises the geographic coordinates of the autonomous vehicle. The payload 614 may additionally include a quotation request 614F. In one embodiment, quotation request 614F comprises a flag requesting a quote for the service. The payload 614 may additionally include additional fields 614G to include any additional data.

In packet 602, the payload 624 includes a closest service provider location 624A. In one embodiment, provider location 624A comprises the address of the closest service provider (discussed previously). The payload 624 additionally includes appointment coordinates 624B. In one embodiment, appointment coordinates 624B comprise a precise geographic coordinate set of where the autonomous vehicle should drive to receive servicing. The payload 624 may additionally include an assistance type 624C. In one embodiment, the assistance type 624C includes a coded identifier of the type of assistance to be provided (e.g., part replacement, refueling, etc.). In another embodiment, the assistance type 624C may indicate that an autonomous delivery vehicle is being routed to the autonomous vehicle. The payload 624 may additionally include a time of service parameter 624D. In one embodiment, the time of service parameter 624D includes time series representing a window for service as discussed previously. The payload 624 may additionally include a cost of service 624E. In one embodiment, the cost of service 624E comprises a decimal or float value representing the cost of the service and may be utilized by the autonomous vehicle to decide whether to approve the service (or, optionally, request additional quotations from other nearby service providers). The payload 624 may additionally include additional fields 624F to include any additional data.

Figure 7:
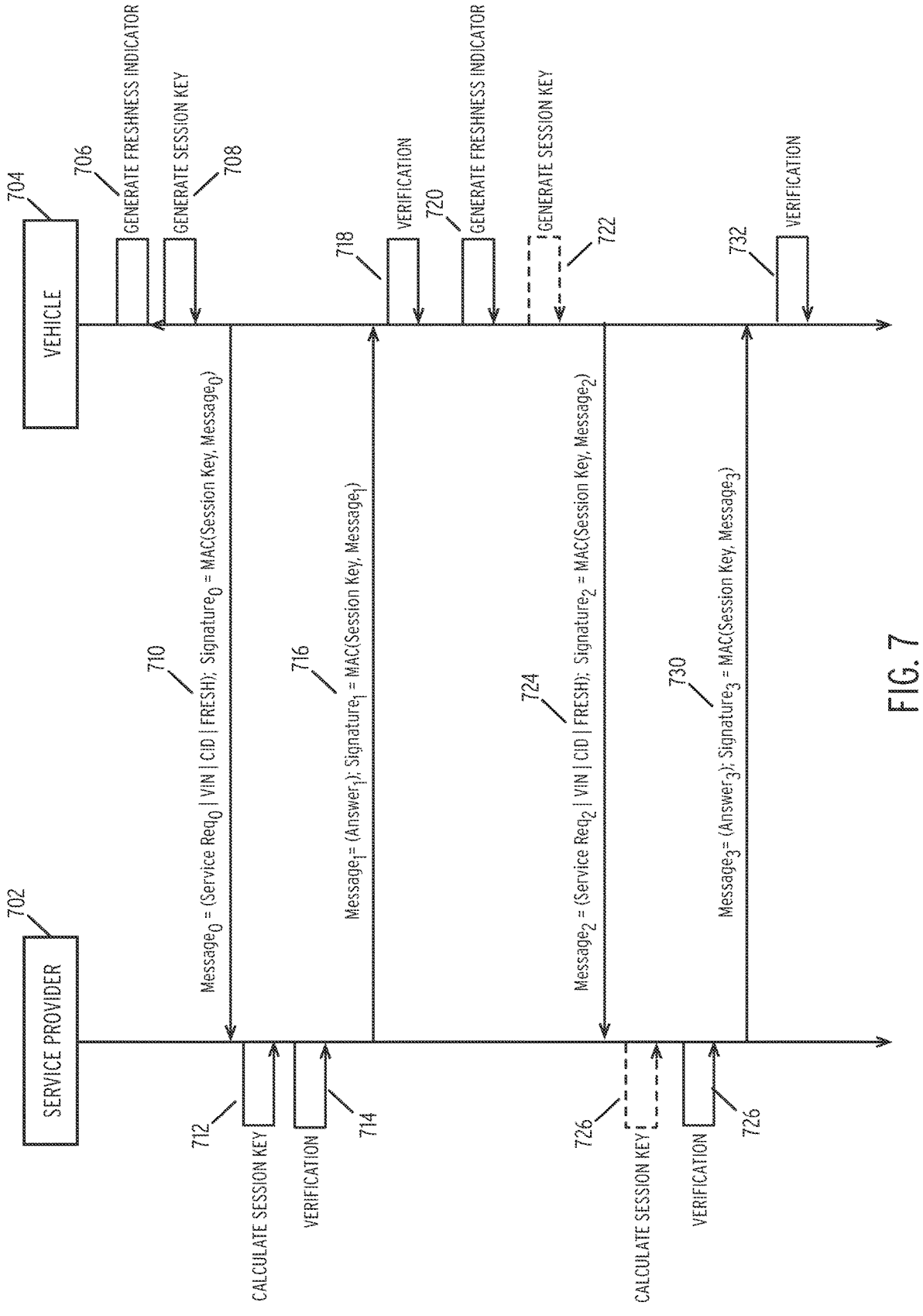
FIG. 7 is a swim lane diagram illustrating a method for transmitting a data packet requesting autonomous vehicle servicing according to some embodiments of the disclosure.

FIG. 7 is a swim lane diagram illustrating a method for transmitting a data packet requesting autonomous vehicle servicing according to some embodiments of the disclosure.

In the illustrated embodiment, messages are transmitted between an autonomous vehicle 704 and a service provider 702. In order to secure messages between the two entities and prevent tampering by third-parties, the method utilizes a freshness indicator and a session key to ensure the integrity of the messages, as discussed herein.

In step 706, the method generates a freshness indicator. In one embodiment, a freshness indicator comprises a unique value to verify the proper ordering of messages. In one embodiment, the freshness indicator is generated using a monotonic counter. In one embodiment, the autonomous vehicle is solely responsible for generating the freshness indicator. By using a freshness indicator, the method additionally ensures that messages cannot be "replayed" as they are explicitly ordered by the freshness indicator.

In step 708, the method generates a session key. In one embodiment, the method generates the session key by extracting a vehicle-specific key from the autonomous vehicle. In one embodiment, a vehicle-specific key comprises a unique identifier explicitly identifying the autonomous vehicle. In one embodiment, the vehicle-specific key is associated with the VIN of the autonomous vehicle and is assigned during the manufacturing of the autonomous vehicle. In one embodiment, the session key is calculated by generating a hash-based MAC (HMAC) using the vehicle-specific key and the freshness indicator as inputs to the HMAC function. The inclusion of the freshness indicator ensures that the session key is pseudorandom. In one embodiment, the session key may be generated by an electronic control module (ECM) of the autonomous vehicle.

In step 710, the method transmits a message and a signature.

In one embodiment, the message includes a service request which comprises a payload discussed in FIG. 6A. The message additionally includes a VIN of the autonomous vehicle and car maker ID (CID). In optional embodiments, the message additionally includes the GPS coordinates of the autonomous vehicle if not included in the payload. Finally, the message includes the freshness indicator. As illustrated, a signature for the message is also transmitted which comprise a MAC generated using the session key and the message.

In step 712, the service provider computes the session key locally. As described above, the session key is calculated by generating a hash-based MAC (HMAC) using the vehicle-specific key and the freshness indicator as inputs to the HMAC function. Here, the vehicle-specific key is not transmitted over the communications bus. Rather, the service provider maintains locally the vehicle-specific keys. In one embodiment, the vehicle-specific key may be identified based on the VIN and CID transmitted in the message. In some embodiments, the vehicle-specific key may be the VIN itself.

In step 714, the method verifies the message. In one embodiment, the method confirms that the freshness indicator matches the expected freshness indicator. In this embodiment, the method maintains a next expected freshness indicator (e.g., the next number of the monotonic counter) and confirms that the freshness indicator in the message is the expected message. The method further validates the signature using the session key generated by the service provider to ensure that the message is properly signed.

After verifying the message, the service provider transmits a responsive message including an answer in step 716. Details of the message are described in FIG. 6B, incorporated by reference in its entirety. The service provider additionally transmits a signature that is generated using the session key and the message. This signature may be computed as a MAC in the same manner discussed in connection with step 710.

In step 718, the autonomous vehicle verifies the answer message. This may be done in a similar manner to that performed in step 714, the description of which is incorporated herein by reference in its entirety. After verifying the response, the autonomous vehicle may perform additional operations as discussed previously throughout this disclosure (e.g., drive the autonomous vehicle to the service provider, await assistance, etc.).

Steps 720 through 732 illustrate alternative embodiments for sending subsequent messages.

In both embodiments, the autonomous vehicle generates a new freshness indicator for a subsequent messages in step 720. This may be performed by incrementing a monotonic counter as described in step 706.

In an alternative embodiment, the method may further generate a new session key using the updated freshness indicator and the same vehicle-specific key. Note that in a first embodiment, the method may not generate a new session key but may utilize the same session key generated in step 708. Since the method uses a freshness indicator, the session key is not required to be recalculated as the freshness indicator allows for verification of the ordering of messages while the session key verifies the identity of the sender.

In step 724, the autonomous vehicle sends the message and signature identical to that performed in step 710. As discussed, the session key sent in step 724 may be the same as that sent in step 710 or may comprise an updated session key.

In step 726, in some embodiments, the service provider calculates a new session key in a manner similar to that discussed in step 712. In this embodiment, the service provider calculates the session key using the vehicle-specific key and the updated freshness indicator included within the message sent in step 724. If the autonomous vehicle does not re-generate a session key, the method may skip step 726 and re-use the session key generated in step 712.

In step 726, the method verifies the message. In one embodiment, the method confirms that the freshness indicator matches the expected freshness indicator. In this embodiment, the method maintains a next expected freshness indicator (e.g., the next number of the monotonic counter) and confirms that the freshness indicator in the message is the expected message. The method further validates the signature using the session key generated by the service provider to ensure that the message is properly signed.

After verifying the message, the service provider transmits a responsive message including an answer in step 730. Details of the message are described in FIG. 6B, incorporated by reference in its entirety. The service provider additionally transmits a signature that is generated using the session key and the message. This signature may be computed as a MAC in the same manner discussed in connection with step 710.

In step 732, the autonomous vehicle verifies the answer message. This may be done in a similar manner to that performed in step 714, the description of which is incorporated herein by reference in its entirety. After verifying the response, the autonomous vehicle may perform additional operations as discussed previously throughout this disclosure (e.g., drive the autonomous vehicle to the service provider, await assistance, etc.).

Figure 8:
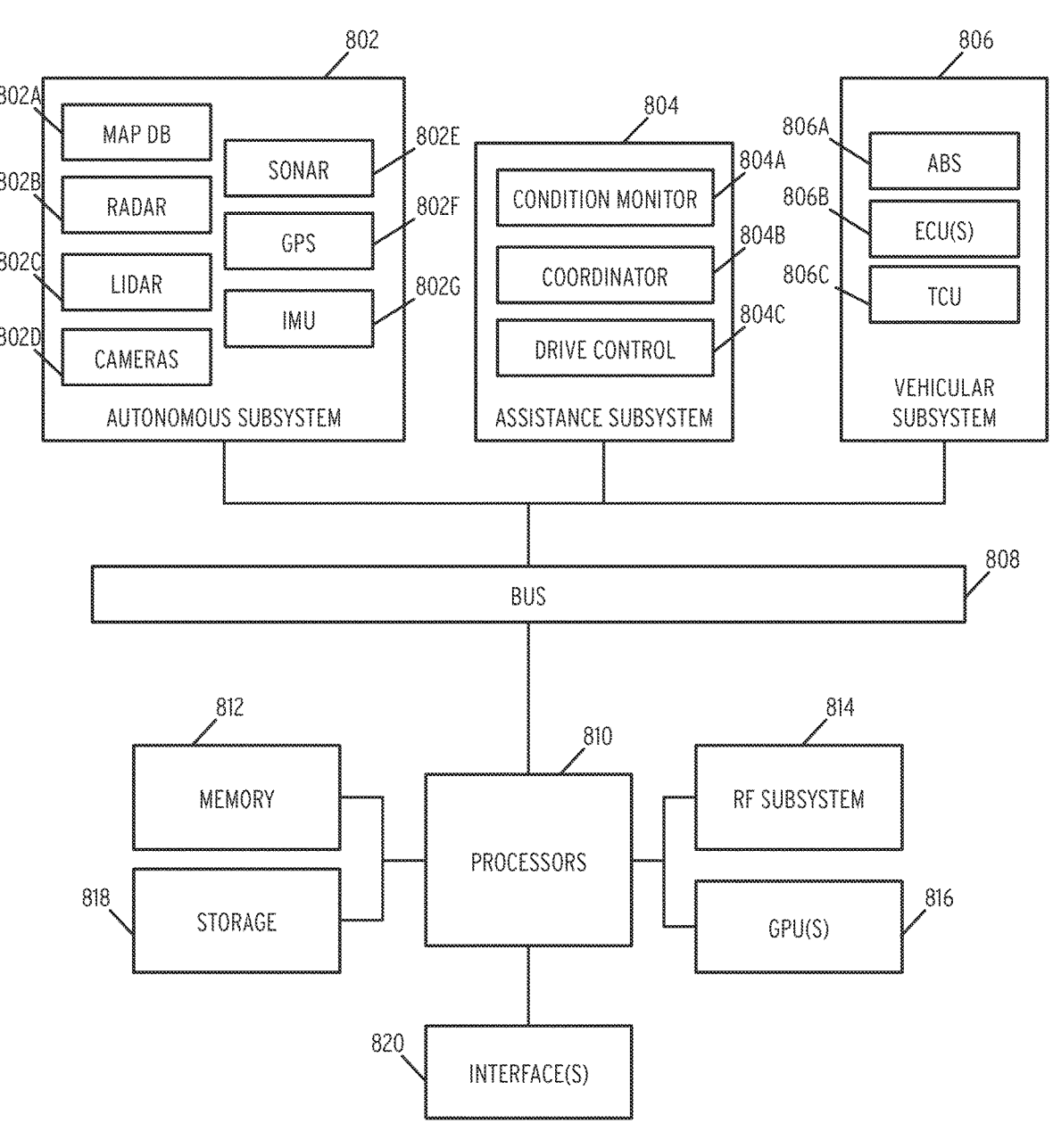
FIG. 8 is a block diagram of an autonomous vehicle according to some embodiments of the disclosure.

FIG. 8 is a block diagram of an autonomous vehicle according to some embodiments of the disclosure.

The system illustrated in FIG. 8 may be installed entirely within a vehicle. In some embodiments, some components (e.g., components and subsystems other than subsystem (804)) may comprise existing autonomous vehicle subsystems.

The system includes an autonomous vehicle subsystem (802). In the illustrated embodiment, autonomous vehicle subsystem (802) includes map database (802A), radar devices (802B), Lidar devices (802C), digital cameras (802D), sonar devices (802E), GPS receivers (802F), and inertial measurement units (802G). Each of the components of autonomous vehicle subsystem (802) comprise standard components provided in most current autonomous vehicles. In one embodiment, map database (802A) stores a plurality of high-definition three-dimensional maps used for routing and navigation. Radar devices (802B), Lidar devices (802C), digital cameras (802D), sonar devices (802E), GPS receivers (802F), and inertial measurement units (802G) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem (806) is additionally included within the system. Vehicular subsystem (806) includes various anti-lock braking systems (806A), engine control units (802B), and transmission control units (802C). These components may be utilized to control the operation of the autonomous vehicle in response to the streaming data generated by autonomous vehicle subsystem (802A). The standard autonomous vehicle interactions between autonomous vehicle subsystem (802) and vehicular subsystem (806) are generally known in the art and are not described in detail herein.

The processing side of the system includes one or more processors (810), short-term memory (812), an RF system (814), graphics processing units (GPUs) (816), long-term storage (818) and one or more interfaces (820).

The one or more processors (810) may comprise central processing units, FPGAs, or any range of processing devices needed to support the operations of the autonomous vehicle. Memory (812) comprises DRAM or other suitable volatile RAM for temporary storage of data required by processors (810). RF system (814) may comprise a cellular transceiver and/or satellite transceiver. Long-term storage (818) may comprise one or more high-capacity solid-state drives (SSDs). In general, long-term storage (818) may be utilized to store, for example, high-definition maps, routing data, and any other data requiring permanent or semi-permanent storage. GPUs (816) may comprise one more high throughput GPU devices for processing data received from autonomous vehicle subsystem (802A). Finally, interfaces (820) may comprise various display units positioned within the autonomous vehicle (e.g., an in-dash screen).

The system additionally includes an assistance subsystem (804) which performs all of the data collection and control operations required by the methods illustrated in the preceding Figures. The assistance subsystem (804) includes a condition monitor (804A) which is configured to detect that a part or component of the autonomous vehicle requires assistance or maintenance. The condition monitor (804) may perform, for example, the methods described in step 102 of FIG. 1, the steps of FIGS. 2A-2D, and the steps performed in FIGS. 3A-3B and related steps.

The assistance subsystem (804) additionally includes a coordinator (804B) configured to coordinate messaging between the autonomous vehicle and a service provider. In the illustrated embodiment, the coordinator (804B) may perform the methods described in step 104 of FIG. 1 and the steps of FIG. 7 and related steps.

The assistance subsystem (804) additionally includes a drive control module (804C) configured to translate the messages and processing of coordinator (804B) into commands to control the autonomous vehicle. In the illustrated embodiment, the coordinator (804B) may perform the methods described in steps 110 through 114 of FIG. 1 and related steps.

Each of the devices is connected via a bus (808). In one embodiment, the bus (808) may comprise a controller area network (CAN), FlexRay, MOST, or similar bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 9:
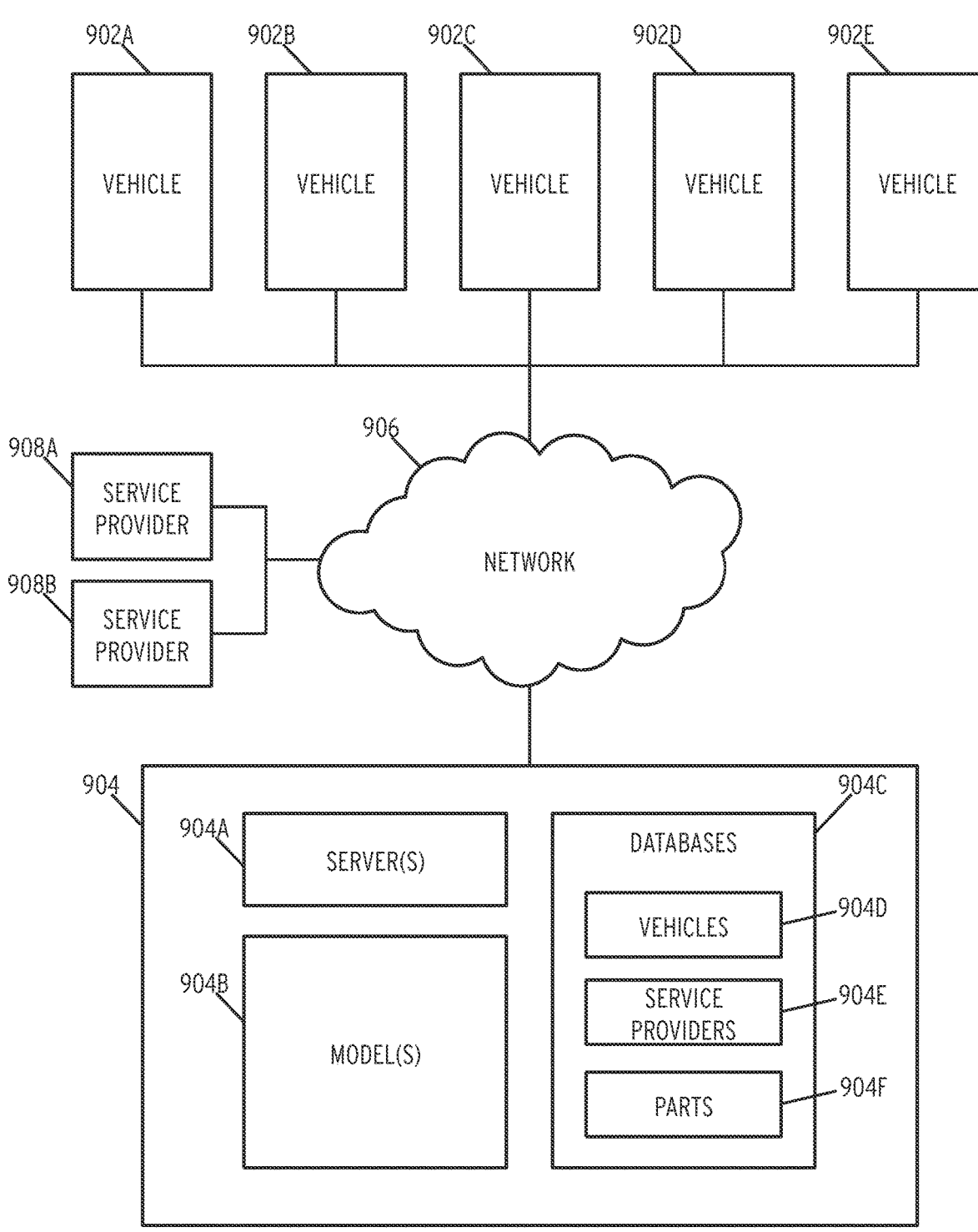
FIG. 9 is a block diagram of a centralized autonomous vehicle operations system according to some embodiments of the disclosure.

FIG. 9 is a block diagram of a centralized autonomous vehicle operations system according to some embodiments of the disclosure.

As illustrated, the system includes a number of autonomous vehicles (902A-902E). In one embodiment, each autonomous vehicle may comprise an autonomous vehicle such as that depicted in FIG. 8, the disclosure of which is incorporated herein by reference in its entirety. Each autonomous vehicle (902A-902E) may communication with a central system (904) via a network (906). In one embodiment, network (906) comprises a global network such as the Internet. Each autonomous vehicle (902A-902E) may additionally communicate with service providers (908A-908B) as discussed previously.

Central system (904) includes a plurality of servers (904A). In one embodiment, servers (904A) comprise a plurality of front end webserver configured to serve responses to client device (908A, 508B). The servers (904A) may additionally one or more application server configured to perform the operations discussed in the previous flow diagrams.

Central system (904) additionally includes a plurality of models (904B). In one embodiment, the models (904B) may be generated by the processes described previously. Specifically, models (904B) may store one or more neural networks for predicting the availability of autonomous vehicles or predicting part failures of autonomous vehicles as discussed throughout the disclosure. In some embodiments the models (904B) may store a combination of neural networks and other machine learning models discussed previously. In some embodiments, the models (904B) may be transmitted to autonomous vehicles (902A-902E) as discussed previously.

Central system (904) additionally includes one or more databases (904C). The databases (904C) may include database record for vehicles (904D), service providers (904E), and parts/components (904F). In one embodiment, the vehicles (904D) may include the autonomous vehicle objects discussed throughout. Service providers (904E) may include details regarding the locations and communications parameters for various service providers (908A-908B). Part data (904F) may comprise a listing of parts associated with autonomous vehicle (902A-902D) and used for training models (904B).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
detecting a trigger of an autonomous vehicle; and
navigating the autonomous vehicle directly to a service center within a predefined time window predicted by a machine learning model in response to the trigger.

2. The method of claim 1, wherein detecting the trigger comprises detecting an expiration of a mileage counter.

3. The method of claim 1, wherein detecting the trigger comprises detecting an expiration of a duration timer.

4. The method of claim 1, wherein detecting the trigger comprises detecting a part failure.

5. The method of claim 4, wherein detecting a part failure comprises monitoring a sensor reading of a part and determining that a current value of the sensor reading does not meet a minimum value.

6. The method of claim 1, wherein detecting the trigger comprises detecting a sensor interrupt signal.

7. The method of claim 6, wherein detecting a sensor interrupt signal comprises detecting a critical event based on the sensor interrupt signal.

8. The method of claim 1, wherein detecting the trigger comprises predicting a part failure using a machine learning model.

9. A device comprising:
a processor; and
a non-transitory computer-readable medium comprising instructions that, when executed by the processor, cause the processor to perform the operations of:
detecting a trigger of an autonomous vehicle; and
navigating the autonomous vehicle directly to a service center within a predefined time window predicted by a machine learning model in response to the trigger.

10. The device of claim 9, wherein detecting the trigger comprises detecting an expiration of a mileage counter.

11. The device of claim 9, wherein detecting the trigger comprises detecting an expiration of a duration timer.

12. The device of claim 9, wherein detecting the trigger comprises detecting a part failure.

13. The device of claim 9, wherein detecting the trigger comprises detecting a sensor interrupt signal.

14. The device of claim 9, wherein detecting the trigger comprises predicting a part failure using a machine learning model.

15. A non-transitory computer-readable storage medium for tangibly storing computer program instructions capable of being executed by a computer processor, the computer program instructions defining steps of:
detecting a trigger of an autonomous vehicle; and
navigating the autonomous vehicle directly to a service center within a predefined time window predicted by a machine learning model in response to the trigger.

16. The non-transitory computer-readable storage medium of claim 15, wherein detecting the trigger comprises detecting an expiration of a mileage counter.

17. The non-transitory computer-readable storage medium of claim 15, wherein detecting the trigger comprises detecting an expiration of a duration timer.

18. The non-transitory computer-readable storage medium of claim 15, wherein detecting the trigger comprises detecting a part failure.

19. The non-transitory computer-readable storage medium of claim 15, wherein detecting the trigger comprises detecting a sensor interrupt signal.

20. The non-transitory computer-readable storage medium of claim 15, wherein detecting the trigger comprises predicting a part failure using a machine learning model.

* * * * *